United States Patent
Christoffel et al.

(10) Patent No.: US 9,446,689 B2
(45) Date of Patent: Sep. 20, 2016

(54) FITTING SYSTEM FOR A VEHICLE SEAT

(75) Inventors: Thomas Christoffel, Herschweiler-Pettersheim (DE); Heinrich Hammann, Teschenmoschel (DE); Christina Krisch, Enkenbach-Alsenborn (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 30 days.

(21) Appl. No.: 14/130,089

(22) PCT Filed: Jun. 8, 2012

(86) PCT No.: PCT/EP2012/060912
§ 371 (c)(1),
(2), (4) Date: Dec. 30, 2013

(87) PCT Pub. No.: WO2013/004450
PCT Pub. Date: Jan. 10, 2013

(65) Prior Publication Data
US 2014/0138998 A1    May 22, 2014

(30) Foreign Application Priority Data
Jul. 1, 2011   (DE) .......................... 10 2011 106 284

(51) Int. Cl.
*B60N 2/235*    (2006.01)

(52) U.S. Cl.
CPC ........... *B60N 2/2354* (2013.01); *B60N 2/2358* (2013.01)

(58) Field of Classification Search
CPC B60N 2/2352; B60N 2/2354; B60N 2/2356; B60N 2/2358
See application file for complete search history.

(56) References Cited

U.S. PATENT DOCUMENTS

| | | | | |
|---|---|---|---|---|
| 4,660,886 A * | 4/1987 | Terada | ................. | B60N 2/2354 297/364 |
| 5,678,895 A * | 10/1997 | Matsuura | ............. | B60N 2/2352 297/366 |
| 5,788,330 A * | 8/1998 | Ryan | ..................... | B60N 2/2354 297/367 R |
| 6,139,105 A * | 10/2000 | Morgos | ................ | B60N 2/2352 297/367 R |
| 6,164,723 A | 12/2000 | Ganot | | |
| 6,273,508 B1 * | 8/2001 | Lange | .................. | B60N 2/2352 297/366 |
| 6,575,278 B1 * | 6/2003 | Schumann | ........... | B60N 2/2352 192/15 |
| 2002/0096924 A1 | 7/2002 | Reubeuze | | |
| 2002/0113479 A1 * | 8/2002 | Deptolla | ............. | B60N 2/2354 297/366 |

(Continued)

FOREIGN PATENT DOCUMENTS

| | | |
|---|---|---|
| CN | 102039830 A | 5/2011 |
| CN | 102088890 A | 6/2011 |

(Continued)

*Primary Examiner* — Timothy J Brindley
(74) *Attorney, Agent, or Firm* — McGlew and Tuttle, P.C.

(57) ABSTRACT

A vehicle seat fitting system has a fitting, by which a backrest can be freely pivoted relative to a seat part and a rotatable memory flag disk coupled to the backrest during the free pivoting and to the seat part in the starting position. The flag disk includes disk toothing and a second toothing is allocated to the backrest. The toothings are engaged during the free pivoting. A control lever with a coupler hinged on the control lever, is coupled to an unlocking lever and moves the toothings into engagement. The flag disk is coupled to the seat part, in the starting position, by a lock receptacle and a control element movable relative to the lock receptacle and the lock receptacle is a section of a control contour by which the control element, arranged on the control lever, holds the control lever directed out during the free pivoting.

19 Claims, 8 Drawing Sheets

(56) References Cited

U.S. PATENT DOCUMENTS

| | | | | |
|---|---|---|---|---|
| 2004/0056523 A1* | 3/2004 | Grable | ............... | B60N 2/0284 297/378.12 |
| 2004/0130199 A1* | 7/2004 | Armbrust | ............... | B60N 2/433 297/378.11 |
| 2006/0091712 A1* | 5/2006 | Tokui | ............... | B60N 2/20 297/367 R |
| 2010/0096897 A1* | 4/2010 | Kienke | ............... | B60N 2/2352 297/367 R |
| 2011/0006583 A1 | 1/2011 | Schwarze et al. | | |
| 2011/0115272 A1* | 5/2011 | Kojima | ............... | B60N 2/2354 297/367 R |
| 2012/0169105 A1 | 7/2012 | Assmann et al. | | |
| 2012/0261964 A1* | 10/2012 | Yamaguchi | ............... | B60N 2/12 297/378.14 |
| 2013/0220049 A1* | 8/2013 | Werner | ............... | B21D 28/00 74/437 |
| 2013/0234489 A1* | 9/2013 | Lehmann | ............... | B60N 2/12 297/366 |

FOREIGN PATENT DOCUMENTS

| | | |
|---|---|---|
| DE | 195 23 254 A1 | 1/1997 |
| DE | 199 15 863 A1 | 10/1999 |
| DE | 100 31 640 A1 | 1/2001 |
| DE | 101 64 035 A1 | 9/2002 |
| DE | 10 2008 026 405 A1 | 12/2009 |
| DE | 20 2009 016 989 U1 | 4/2010 |
| DE | 10 2009 029 858 A1 | 12/2010 |
| EP | 2 305 070 A1 | 4/2011 |

* cited by examiner

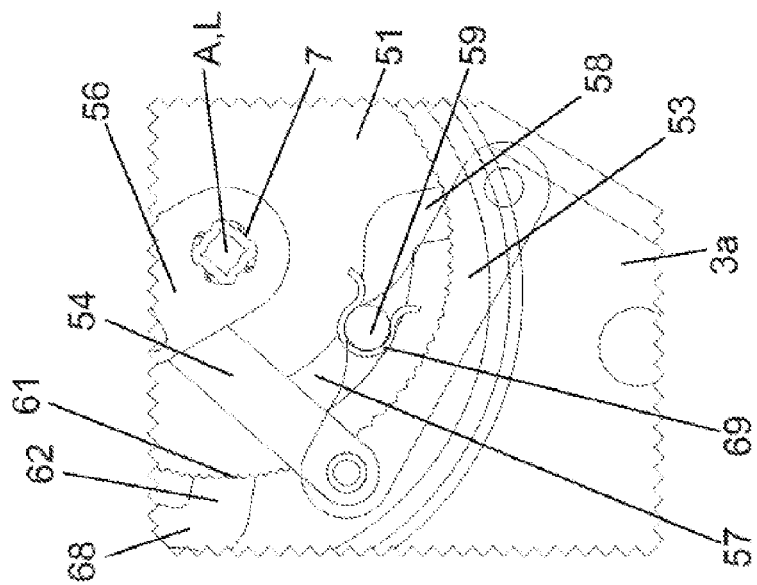
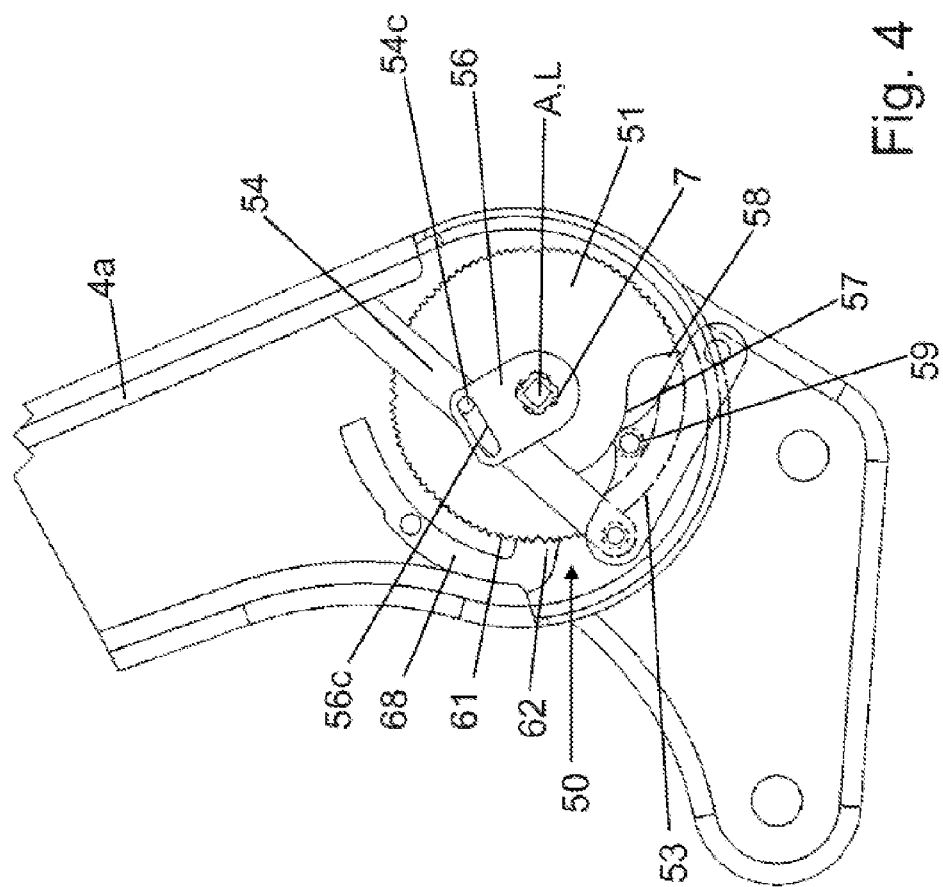

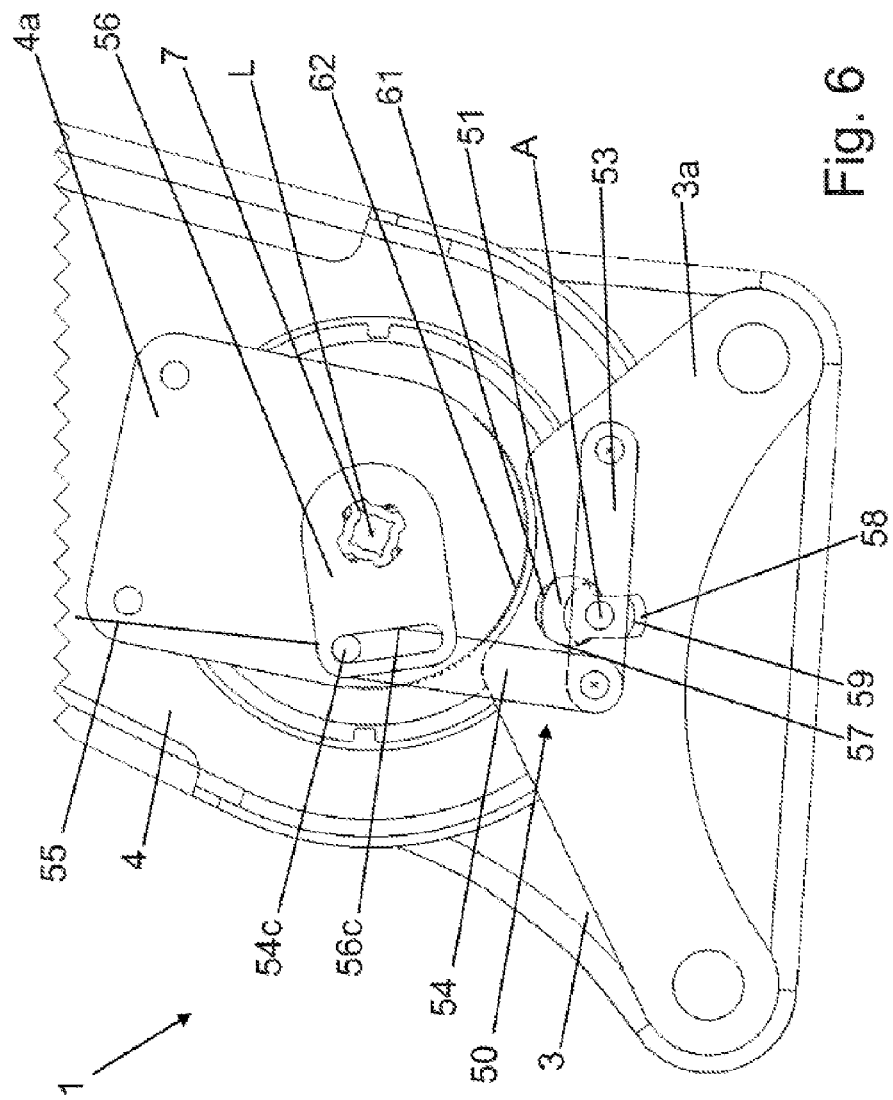

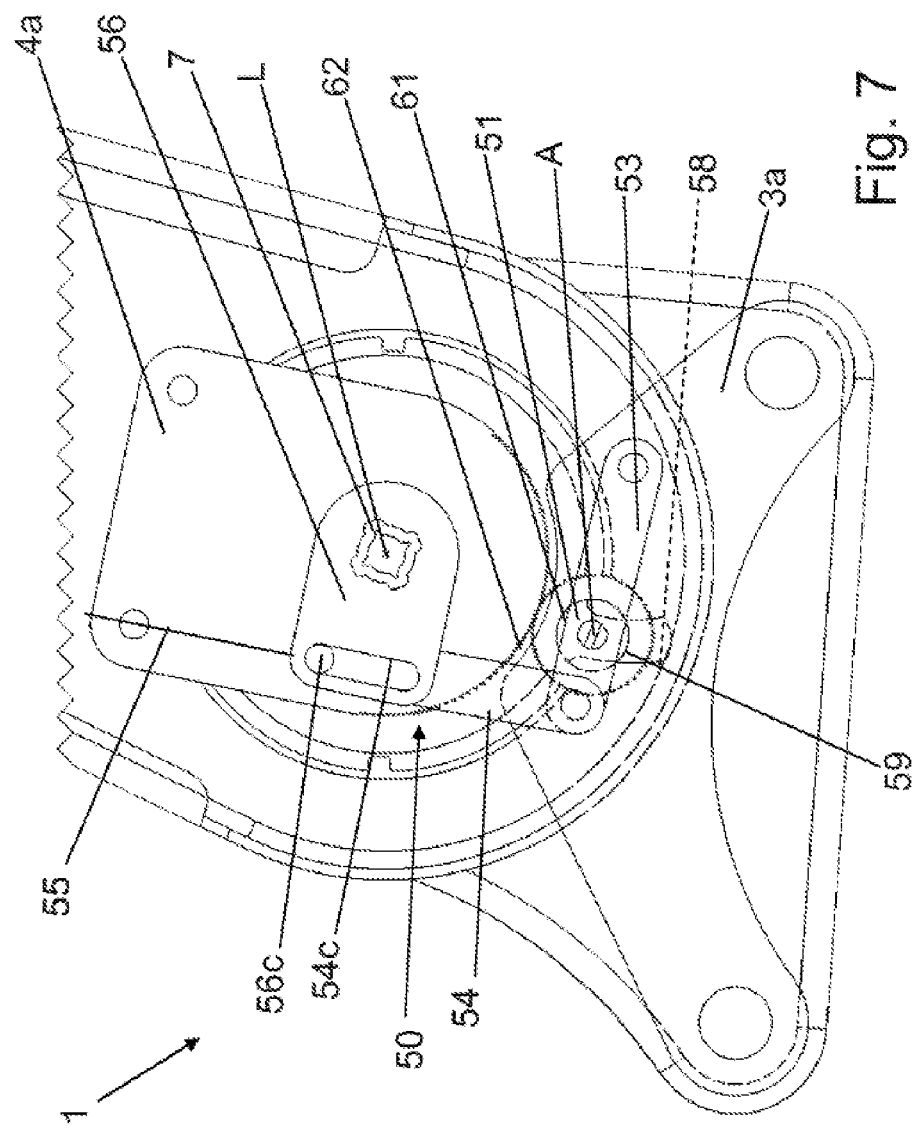

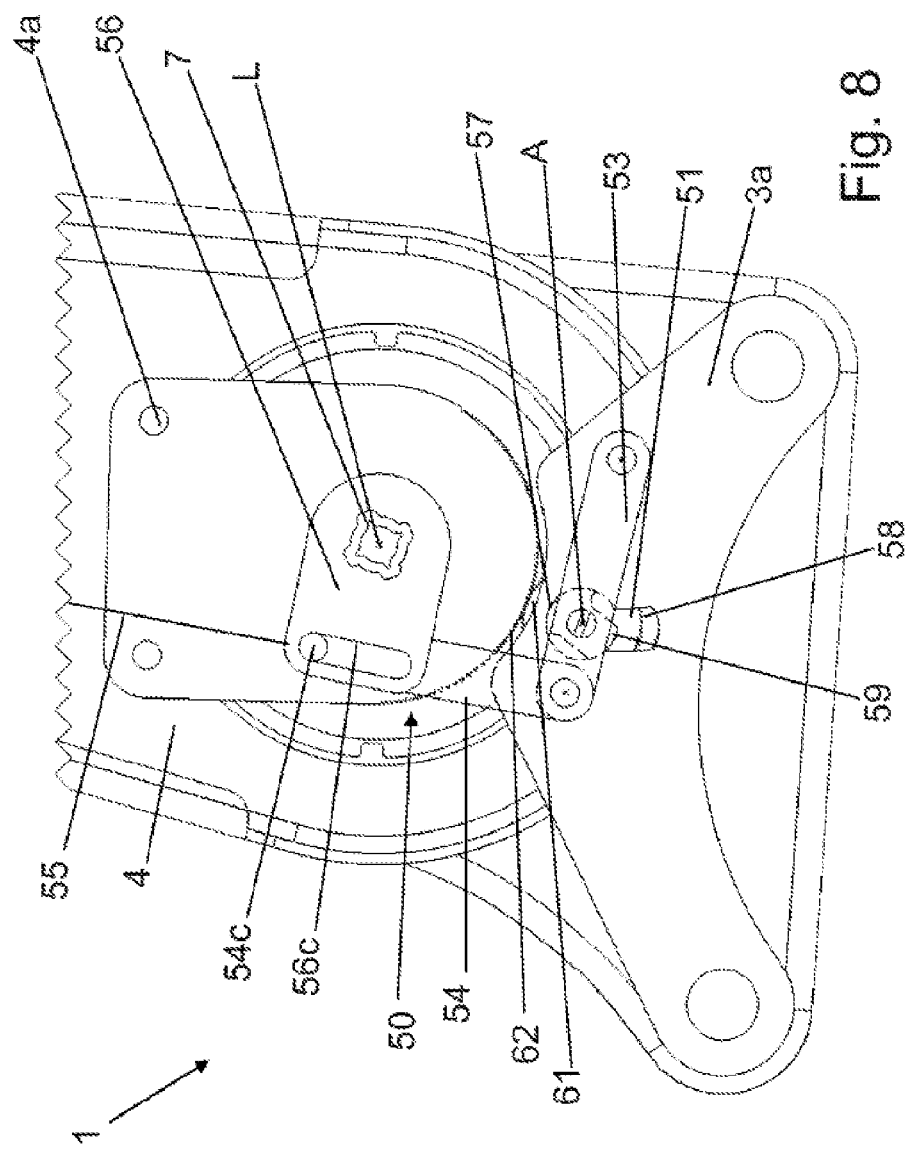

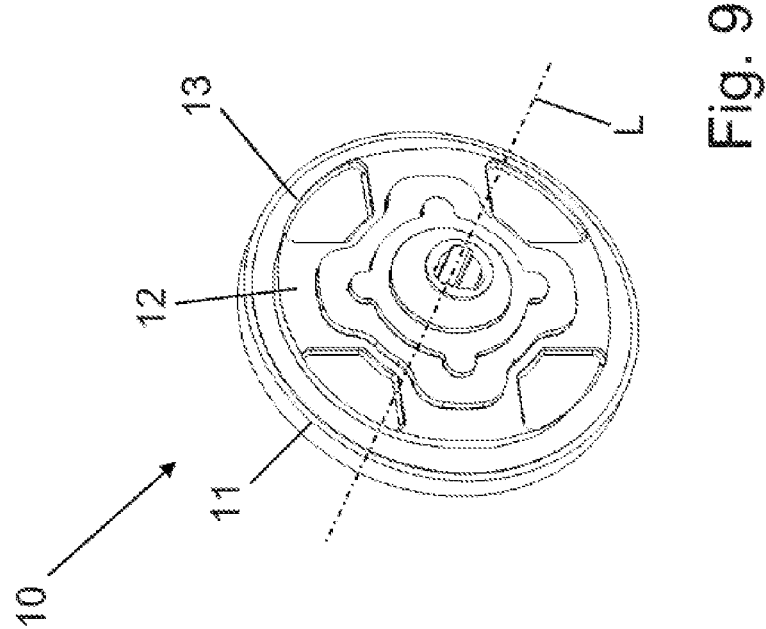
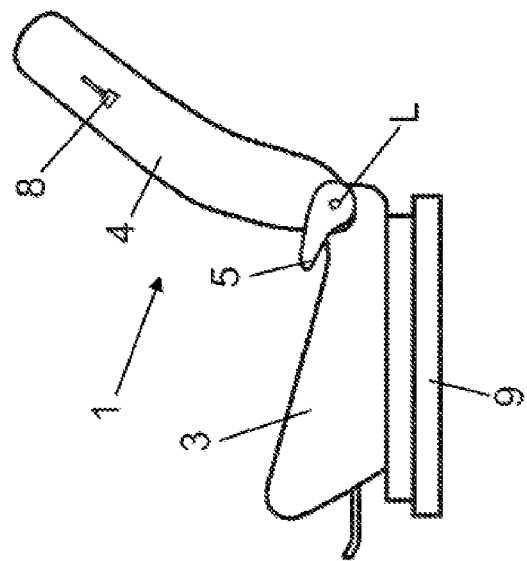

FITTING SYSTEM FOR A VEHICLE SEAT

CROSS REFERENCE TO RELATED APPLICATIONS

This application is a United States National Phase Application of International Application PCT/EP2012/060912 filed Jun. 8, 2012 and claims the benefit of priority under 35 U.S.C. §119 of German Patent Application DE 10 2011 106 284.3 filed Jul. 1, 2011, the entire contents of which are incorporated herein by reference.

FIELD OF THE INVENTION

The invention relates to a fitting system for a vehicle seat with at least one fitting which lies in a force flux between a backrest of the vehicle seat and a seat part of the vehicle seat and by means of which the backrest is pivotable in a pivoting release operation about a backrest axis relative to the seat part from at least one use position into a non-use position, and with a memory device which, at least in a starting position, lies outside the force flux between backrest and seat part and which has a marker disk which is mounted rotatably about an axis and, during the pivoting release operation, is coupled to the backrest and, in the starting position, is coupled to the seat part, and on which a first toothing curved about the axis is formed, wherein the backrest is assigned a second toothing, wherein the first toothing and the second toothing are in engagement with each other during the pivoting release operation.

BACKGROUND OF THE INVENTION

A fitting system of this type with a fitting designed as a latching fitting on either side is known from DE 10 2009 029 858 A1. The memory device comprises a disk-shaped guide plate fixed on the seat part, a marker disk which is rotatable relative to the guide plate, a disk-shaped toothed plate which is rotatable relative to the marker disk and is fixed on the backrest, and a disk cam which is rotatable by means of a shaft. All of the axes of rotation are aligned with one another and with the pivot axis of the backrest. The guide plate guides a first locking element in the radial direction. The toothed first locking element interacts with a first toothing, facing radially inward, on the marker disk in order to couple the marker disk to the seat part. The marker disk guides a second locking element in the radial direction. The toothed second locking element interacts with a second toothing, facing radially inward, on the toothed plate in order to couple the marker disk to the backrest. The rotating disk cam moves the two locking elements in the radial direction.

SUMMARY OF THE INVENTION

The invention is based on the object of providing an alternative fitting system of the type mentioned at the beginning, the memory device of which consists of just a few simple components.

According to the invention, a fitting system is provided for a vehicle seat, in particular for a motor vehicle seat, with at least one fitting which lies in a force flux between a backrest of the vehicle seat and a seat part of the vehicle seat. By means of the fitting system, the backrest is pivotable in a pivoting release operation about a backrest axis relative to the seat part from at least one use position into a non-use position. The fitting system has a memory device which, at least in a starting position, lies outside the force flux between the backrest and the seat part and which has a marker disk which is mounted rotatably about an axis and, during the pivoting release operation, is coupled to the backrest and, in the starting position, is coupled to the seat part, and on which a first toothing curved about the axis is formed, wherein the backrest is assigned a second toothing. The first toothing and the second toothing are in engagement with each other during the pivoting release operation. A control lever is provided that is deflectable relative to the seat part and at least temporarily couples the marker disk to the seat part. A coupler is hinged to the control lever and, for the pivoting release operation, is coupled to a release lever for the fitting. The deflected control lever and/or the coupler which is moved by the deflected control lever bring the first toothing and the second toothing into engagement with each other for the pivoting release operation. In the starting position, the marker disk is coupled to the seat part by means of a lock receptacle and a control element which is movable relative to the lock receptacle. The lock receptacle is a portion of a control contour by means of which the control element arranged on the control lever keeps the control lever deflected during the pivoting release operation.

The use of levers and couplers instead of entire disks reduces the quantity of material required and also the construction space, and therefore the weight and production costs. The levers and couplers provide the pivoting release operation both for an alternating coupling of the marker disk and for releasing the fittings provided. A decoupling, preferably by means of an idle travel, is provided for adjusting an inclination. The memory device never lies in the force flux between backrest and seat part.

The toothings which are produced by means of precision cutting are limited to a coupling, expediently to the coupling to the backrest, which reduces the production costs. The coupling to the seat part is preferably achieved by a simple engagement between a control element and a lock receptacle. The lock receptacle is preferably a portion of a control contour which, during the pivoting release operation, keeps the control lever deflected by interaction with the control element, as a result of which the toothings are kept in engagement.

Even though the description of the invention is based, in respect of the arrangement of the installed fitting system, on the fact that the marker disk is coupled to the backrest during the pivoting release operation and otherwise is coupled to the seat part, an inverted installation of the fitting system enables the conditions to be set the other way around, i.e. the marker disk would then be coupled to the seat part during the pivoting release operation and otherwise would be coupled to the backrest.

The fitting system according to the invention is preferably used for pivoting the backrest in vehicle seats. However, it can also be used at different locations.

The invention is explained in more detail below with reference to two exemplary embodiments which are illustrated in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a side view corresponding to FIG. 1 in the pivoted and released position;

FIG. 5 is a partial view of a modification of the first exemplary embodiment;

FIG. 6 is a side view of the second exemplary embodiment in a use position;

FIG. 7 is a side view corresponding to FIG. 1 at the beginning of the pivoting release operation;

FIG. 8 is a side view corresponding to FIG. 1 during the pivoting release operation;

FIG. 9 is a perspective view of a fitting; and

FIG. 10 is a schematic illustration of a vehicle seat.

DESCRIPTION OF THE PREFERRED EMBODIMENTS

Figure 1:
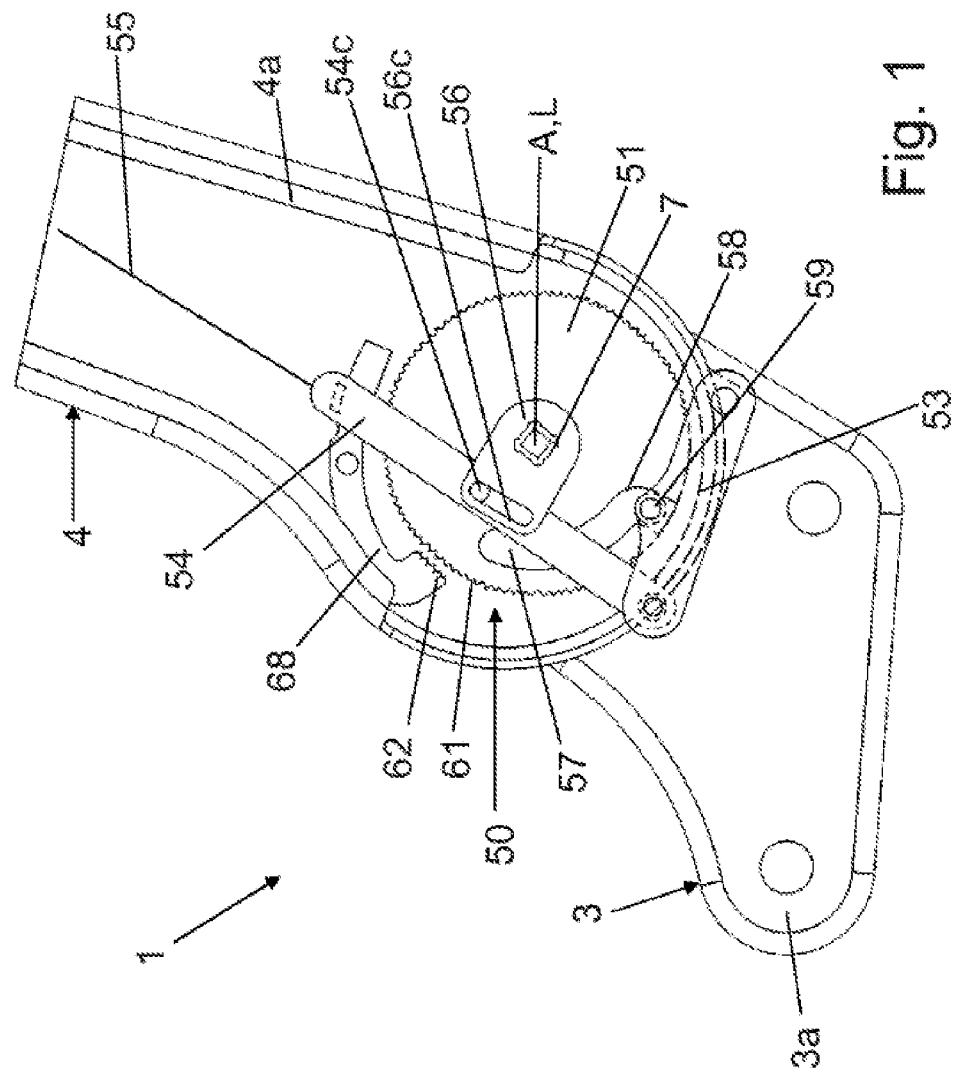
FIG. 1 is a side view of the first exemplary embodiment in a use position.

Referring to the drawings in particular, a vehicle seat 1 for a motor vehicle has a seat part 3 and a backrest 4 which is pivotable relative thereto about a backrest axis L. By means of actuation of a first actuating element 5, which preferably rotates a shaft 7 in the transition region between seat part 3 and backrest 4, the inclination of the backrest 4 relative to the seat part 3 is adjustable between different use positions. By means of actuation of a second actuating element 8, the backrest 4 is pivotable into a non-use position, in the present case the pivoted and released position, in which the forwardly pivoted backrest 4 facilitates access to a rear seat row. The longitudinal position of the vehicle seat 1 is optionally adjustable by means of seat rails 9 which are preferably also released during the pivoting release operation so that the vehicle seat 1 can be pushed forward as a whole. The inclination adjustment and the pivoting release of the backrest 4 take place by means of fittings 10 by means of which the backrest 4 is attached on both sides to the seat part 3.

The fitting 10 has a first fitting part 11 and a second fitting part 12 which are rotatable relative to each other about the backrest axis L. The backrest axis L defines the directional details used from a system of cylindrical coordinates. The shaft 7 is aligned with the backrest axis L. The two fitting parts 11 and 12 can each be inscribed approximately in a circular disk shape. To absorb the axially acting forces, i.e. to hold the fitting parts 11 and 12 together axially, a clasp ring 13 is preferably provided. The fitting 10 is designed as a latching fitting, i.e. the two fitting parts 11 and 12 are lockable to each other, for example by means of a plurality of toothed locking means which are guided radially by the second fitting part 12 and, acted upon by an eccentric which is at least indirectly spring-loaded, are moved radially outward where they interact with a toothed rim formed on the first fitting part 11, in order to lock the fitting 10, whereas, by rotation of the shaft 7 which preferably rotates a driver which, in turn, rotates the eccentric and preferably a disk cam interacting with the locking means, said locking means are drawn radially inward in order to unlock the fitting 10. A latching fitting of this type is described, for example, in DE 20 2009 016 989 U1, the disclosure of which in this regard is expressly incorporated.

On installation of the fitting 10, the first fitting part 11 is connected, for example fixedly, to the structure of the backrest 4, i.e. is connected fixedly on the backrest. The second fitting part 12 is then connected fixedly to the structure of the seat part 3, i.e. is connected fixedly on the seat part. However, the assignments of the fitting parts 11 and 12 can also be interchanged, i.e. the first fitting part 11 would then be fixed on the seat part and the second fitting part 12 would then be fixed on the backrest. The fitting 10 lies in the force flux between backrest 4 and seat part 3.

On one side of a vehicle seat, a memory device 50 which lies outside the force flux is provided between the backrest 4 and the seat part 3. The fittings 10 on both sides of the vehicle seat and the memory device 50 are parts of a fitting system of the vehicle seat 1. The memory device 50 has a marker disk 51 which is mounted rotatably about an axis A. The marker disk 51 is arranged in an axially offset manner with respect to the fitting 10 provided on the same side of the vehicle seat. The marker disk 51 can be mounted rotatably, for example, on said associated fitting 10, on a backrest element 4a fixed on the backrest or on a seat part element 3a fixed on the seat part. The marker disk 51 is coupled to the backrest 4, preferably fixed temporarily on the backrest, during the pivoting release operation, but otherwise is coupled to the seat part 3, preferably fixed (temporarily) on the seat part.

A control lever 53 is mounted pivotably on the seat part element 3a and is prestressed away from the backrest axis L by means of a spring (not illustrated). The control lever 53 is coupled to the marker disk 51 at one point in a manner described more precisely further on. A coupler 54 is hinged on the control lever 53. The hinge point of the coupler 54 is at a greater distance from the pivot axis of the control lever 53 than the point of the coupling to the marker disk 51. The coupler 54 has an elongate design, with the hinge point on the control lever 53 being provided at one end and a cable 55 being fastened to the opposite end, said cable forming the operative connection (or at least part thereof) between the second actuating element 8 and the memory device 20. The coupler 54 is coupled with idle travel to a release lever 56. In the present case, said coupling takes place approximately in the center of the coupler 54 by means of a slot and pin guide, consisting of a release slot 56c in the release lever 56 and a release pin 54c on the coupler 54. In the present case, the release lever 56 sits on the shaft 7 for conjoint rotation, in the same manner as the first actuating element 5, but can also be operatively connected to the first actuating element 5 in another way.

In order to couple the marker disk 51 to the seat part 3, a control contour 57 with a lock receptacle 58 and a control element 59 interacting with the control contour 57 are provided. The lock receptacle 58 is preferably designed as a section of the control contour 57 that runs at least approximately radially (outward in the present case). The control element 59 can engage—preferably in an interlocking manner—in the lock receptacle, as a result of which the control contour 57 and the control element 59 are fixed relative to each other. Outside the lock receptacle 58, the control contour 57 and the control element 59 are movable relative to each other about an axis A. The control element 59 is arranged on the control lever 53 (in a fixed or movable manner). The control lever 53 is preferably arranged in a manner offset axially with respect to the control contour 57, and the control element 59 projects into the control contour 57. The control lever 53 is prestressed in such a manner that, outside the pivoting release operation, the control element 59 is held in the lock receptacle 58. As a result, outside the pivoting release operation, the marker disk 51 is coupled to the seat part 3 and is therefore fixed on the seat part with respect to rotational movements in the circumferential direction. For the coupling of the marker disk 51 to the backrest 4, the outer border of the marker disk 51 has a first toothing 61. The backrest 4 is assigned a second toothing 62 which is opposite the first toothing 61. Outside the pivoting release operation, the two toothings 61 and 62 are spaced apart from each other, i.e. the marker disk 51 and the backrest 4 are decoupled. For the pivoting release operation, the two toothings 61 and 62 can be brought into engagement with each other in a manner described in more detail further on.

In the locked state of the fitting system (FIGS. 1, 6), the two fittings 10 are in each case locked and the memory device 50 is in the starting position, in which the control element 59 engages in the lock receptacle 58, and therefore the marker disk 51 is coupled to the seat part 3. The backrest 4 and the marker disk 51 are decoupled, i.e. the toothings 61 and 62 are spaced apart from each other. The release pin 54c bears against the leading end of the release slot 56c.

Figure 2:
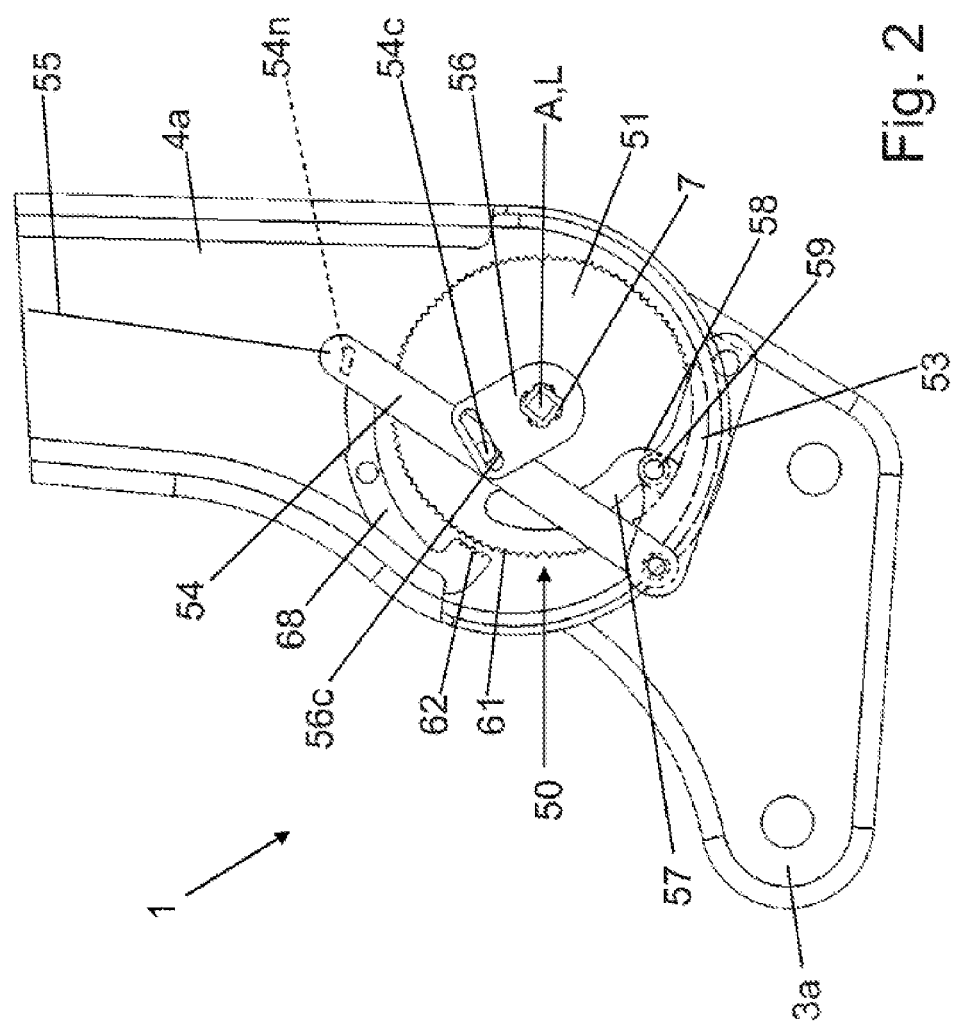
FIG. 2 is a side view corresponding to FIG. 1 during the adjustment of the inclination.

For the adjustment of the inclination (FIG. 2) of the backrest 4, the first actuating element 5 is pivoted, said actuating element rotating the shaft 7 about its own axis, i.e. about the backrest axis L. The shaft 7 thereby releases the two fittings 10. In addition, the shaft 7 pivots the release lever 56. The release slot 56c moves relative to the release pin 54c without a coupling arising. The coupler 54 therefore remains in the starting state. While the backrest 4 and therefore the backrest element 4a pivot about the backrest axis L into a use position having a different inclination, the second toothing 62 remains at a distance from the first toothing 61. If, in the use position with the newly adjusted inclination, the first actuating element 5 is let go of, the fittings 10 automatically lock, and the release lever 56 returns into the starting position.

For the pivoting release operation (FIGS. 3, 4, 7, 8), the coupler 54 is pulled (upward) in the radial direction by means of the second actuating element 8 and preferably the seat rails 9 are also released. The coupler 54 carries along the release lever 56 by means of the release pin 54c (and the release slot 56c), as a result of which said release lever rotates the shaft 7 which thereupon releases the fittings 10. Furthermore, the coupler 54 carries along the control lever 53 which is deflected and thereby disengages the control element 59 and the lock receptacle 58. Owing to the movement of the control lever 53 and of the coupler 54, the first toothing 61 and the second toothing 62 enter into engagement with each other. The marker disk 51 is then coupled to the backrest 4 and decoupled from the seat part 3. The toothings 61 and 62 which are brought into engagement with each other store the adjusted inclination of the backrest 4. If the backrest 4 is then pivoted forward about the backrest axis L into the pivoted and released position, the backrest 4, more precisely the backrest element 4a with the second toothing 62, rotates the marker disk 51. The control lever 53 remains in the deflected position thereof. The coupler 54 likewise remains in the position thereof. With or following the pivoting of the backrest 4, the vehicle seat 1 is preferably pushed forward as a whole.

When the backrest 4 is returned into the previously adopted use position with the stored inclination, the control element 59 passes again to the lock receptacle 58 and is then aligned thereon. The prestressing of the deflected control lever 53 pivots said control lever back into the starting position, as a result of which the control element 59 is drawn into the lock receptacle 58. The control lever 53 returning from the deflected position thereof into the starting position thereof carries along the coupler 54 again. By means of the slot and pin guide consisting of release pin 54c and release slot 56c, the coupler 54 unblocks the release lever 56, as a result of which the internal prestressings of the fittings 10 ensure that the shaft 7 rotates into the starting position and that the fittings 10 are locked. Owing to the movement of the control lever 53 and of the coupler 54, the toothings 61 and 62 become disengaged. As a result, the marker disk 51 is decoupled from the backrest 4 and coupled again to the seat part 3. The seat rails 9 preferably contain a dedicated memory device which, for the pivoting release operation, stores the previously adopted longitudinal position of the seat.

In the first exemplary embodiment (FIGS. 1 to 4), the axis A of the marker disk 51 is aligned with the backrest axis L. The marker disk 51 is preferably mounted rotatably on the driver of the associated fitting 10. The marker disk 51 has a control contour 57, the one end of which forms the lock receptacle 58 which runs radially outward, but which otherwise runs in the circumferential direction, specifically over an angle which corresponds at least to the angle traversed by the backrest 4 during the pivoting release operation. The control contour 57 can be designed as an elongated hole, as a groove or as an outer border of the marker disk 51. The control element 59, which is preferably designed as a pin, is provided fixedly on the control lever 53, i.e. is fastened thereto or produced integrally therewith.

The first toothing 61 on the marker disk 51 points radially outward and extends in the circumferential direction over an angle which corresponds at least to the angle traversed by the backrest 4 during the adjustment of the inclination. Adjacent to the marker disk 51, a pawl 68 is mounted pivotably on the backrest element 4a. One end of the pawl 68 has the second toothing 62, which points radially inward. The pawl 68 is designed as a two-armed lever. The coupler 54 bears with a retaining lug 54n against that end of the pawl 68 which is opposite the second toothing 62. The retaining lug 54n formed on the coupler 54 can in this case act in the radial direction on the pawl 68 and can slide along the pawl 68 in the circumferential direction. The pawl 68 is prestressed toward the marker disk 51 by means of a spring (not illustrated), but is kept open by the coupler 54 by means of the retaining lug 54n.

Figure 3:
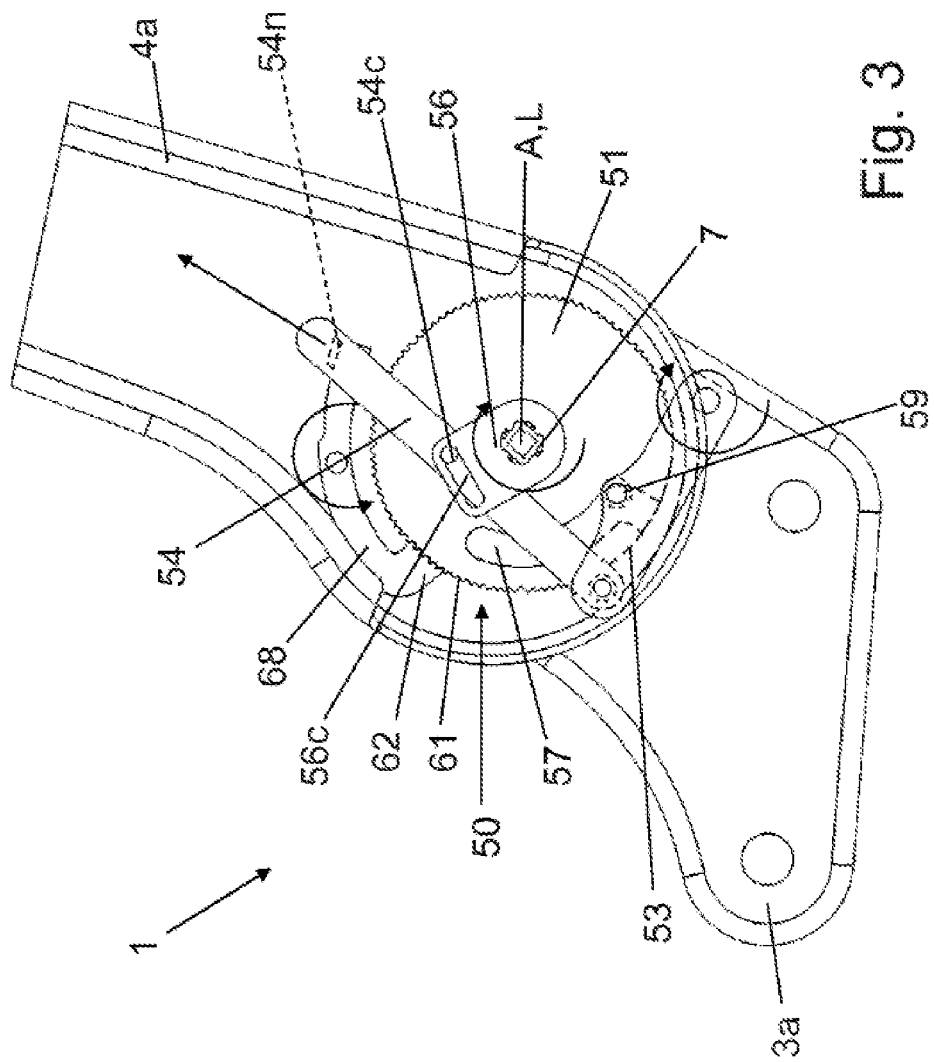
FIG. 3 is a side view corresponding to FIG. 1 at the beginning of the pivoting release operation.

During the adjustment of the inclination (FIG. 2) of the backrest 4, the pawl 68 moves relative to the marker disk 51 and to the coupler 54, the pawl keeping the second toothing 62 at a distance from the first toothing 61 and sliding along the retaining lug 54n of the coupler 54. For the pivoting release operation, the coupler 54 deflects the control lever 53, as a result of which the control element 59 is brought by the lock receptacle 58 into that section of the control contour 57 which runs in the circumferential direction. This section of the control contour 57 keeps the control lever 53 deflected. The retaining lug 54n of the coupler 54 unblocks the pawl 68, which is prestressed in a closing manner, the pawl pivoting with respect to the marker disk 51 and thereby bringing the second toothing 62 into engagement with the first toothing 61 (FIG. 3). If the backrest 4 is then pivoted forward, the backrest element 4a carries along the marker disk 51 by means of the pawl 68. The control contour 57 moves relative to the control element 59 which, in the process, is kept in the radial position thereof. The deflected control lever 53 keeps the coupler 54 in the position thereof unblocking the pawl 68. The second actuating element 8 can therefore be let go of (FIG. 4). If, during the return of the backrest 4 into the previously adopted use position, the control lever 53 returns into the starting position, said control lever therefore brings the coupler 54 back into the starting position. The retaining lug 54n of the coupler 54 returning into the starting position thereof pivots the closed pawl 68 which opens such that the toothings 61 and 62 become disengaged (FIG. 1).

In a modified embodiment (FIG. 5) of the first exemplary embodiment, a spring clip 69 is provided at the location which corresponds to the pivoted and released position. The spring clip 69 gently receives the arriving control element 59 and thereby stops the pivoting movement of the backrest 4 ("softstop"). At the same time, said control element can secure the backrest 4 non-positively in the pivoted and released position. By an actuating force being applied to the backrest 4, the spring clip 69 unblocks the control element 59 again.

In the second exemplary embodiment (FIGS. 6 to 8), the axis A of the marker disk 51 is arranged offset parallel to the backrest axis L. The marker disk 51 is mounted rotatably on the control lever 53. The marker disk 51 bears the control element 59 which is fastened thereto (or is produced integrally therewith). A control contour 57 in the form of a keyhole is formed on the seat part element 3a. The control element 59 is rotatable about the axis A in the round section of the control contour 57, while the elongate section of the control contour 57 forms the lock receptacle 58. The control element 59 is approximately in the shape of a mushroom, with a cap matching the round section of the control contour 57 and with a stem matching the lock section 58. The first toothing 61 is formed peripherally on the outer border of the marker disk 51. The second toothing 62 is formed on the backrest element 4a concentrically with respect to the backrest axis L and runs in a circular arc over an angle which corresponds at least to the angle traversed by the backrest 4 during the pivoting release operation. The radius of curvature of the second toothing 62 is greater than the radius of the marker disk 51, which radius defines the radius of curvature of the first toothing 61, for example is two to three times the size.

During the adjustment of the inclination of the backrest 4, the backrest element 4a moves relative to the marker disk 51 without acting thereon. For the pivoting release operation, the coupler 54 deflects the control lever 53, as a result of which the control element 59 is brought from the lock receptacle 58 into the round section of the control contour 57. This round section of the control contour 57 keeps the control lever 53 deflected as soon as the stem of the mushroom-shaped control element 59 is rotated about the axis A. With the deflection of the control lever 53, the marker disk 51 draws closer to the backrest element 4 in the radial direction until the first toothing 61 is brought into engagement with the second toothing 62 (FIG. 7). The result is a gearing, the transmission ratio of which is defined by the radii of curvature of the two toothings 61 and 62. If the backrest 4 is then pivoted forward, the backrest element 4a rotates the marker disk 51. The control element 59 rotates relative to the control contour 57. The axis A of the marker disk 51 is thereby kept in its position, and this keeps the control lever 53 deflected. The deflected control lever 53 keeps the coupler 54 in the position thereof acting upon the release lever 56 (FIG. 8). The second actuating element 8 can therefore be let go of. If, during the return of the backrest 4 into the previously adopted use position, the control lever 53 returns into the starting position, said control lever brings the coupler 54 back into the starting position. The control lever 53 pivoting into the starting position removes the marker disk 51 from the backrest element 4a, and therefore the toothings 61 and 62 become disengaged (FIG. 6).

While specific embodiments of the invention have been shown and described in detail to illustrate the application of the principles of the invention, it will be understood that the invention may be embodied otherwise without departing from such principles.

The invention claimed is:

1. A fitting system for a vehicle seat, the fitting system comprising:
  a fitting which lies in a force flux between a backrest of the vehicle seat and a seat part of the vehicle seat and by means of which the backrest is pivotable in a pivoting release operation about a backrest axis relative to the seat part from at least one use position into a non-use position;
  a memory device which, at least in a starting position, lies outside the force flux between the backrest and the seat part, the memory device comprising a marker disk mounted rotatably about a disk axis and, during the pivoting release operation, coupled to the backrest and, in the starting position, coupled to the seat part, the marker disc having a first toothing curved about the disk axis, wherein the backrest is assigned a second toothing, wherein the first toothing and the second toothing are in engagement with each other during the pivoting release operation;
  a control lever deflectable relative to the seat part and at least temporarily coupling the marker disk to the seat part;
  a release lever; and
  a coupler hinged to the control lever and, for the pivoting release operation, coupled to the release lever, wherein the deflected control lever and/or the coupler which is moved by the deflected control lever bring the first toothing and the second toothing into engagement with each other for the pivoting release operation, wherein, in the starting position, the marker disk is coupled to the seat part by means of a lock receptacle and a control element which is movable relative to the lock receptacle, and the lock receptacle is a portion of a control contour by means of which the control element, arranged on the control lever, keeps the control lever deflected during the pivoting release operation, wherein the lock receptacle is provided on the marker disk and the control element is provided fixedly on the control lever, wherein the control contour is partially curved about the disk axis.

2. The fitting system as claimed in claim 1, wherein the disk axis of the marker disk is aligned with the backrest axis.

3. The fitting system as claimed in claim 1, wherein the second toothing is formed on a pawl which is mounted pivotably on the backrest.

4. The fitting system as claimed in claim 3, wherein, in the starting position, the coupler keeps the pawl at a distance from the marker disk, by means of a holding lug, and releases said pawl for the pivoting release operation.

5. The fitting system as claimed in claim 1, wherein the disk axis of the marker disk is arranged offset parallel to the backrest axis.

6. The fitting system as claimed in claim 5, wherein the lock receptacle is provided on a seat part element fixed on the seat part and the control element is provided fixedly on the marker disk.

7. The fitting system as claimed in claim 6, wherein the marker disk is mounted rotatably on the control lever.

8. The fitting system as claimed in claim 7, wherein the second toothing is formed on a backrest element and is curved about the backrest axis.

9. The fitting system as claimed in claim 1, further comprising an actuating element connected to the release lever for conjoint rotation, via a shaft, and can be pivoted in order to release the fitting.

10. The fitting system as claimed in claim 1, further comprising an actuating element operatively connected to the coupler via a cable, and can be actuated for the pivoting release operation.

11. A vehicle seat comprising
a seat part;
a backrest; and
a fitting system attaching the backrest to the seat part, with the backrest being pivotable relative to said seat part and lockable at different inclination settings, the fitting system comprising:
a fitting which lies in a force flux between a backrest of the vehicle seat and a seat part of the vehicle seat and by means of which the backrest is pivotable in a pivoting release operation about a backrest axis relative to the seat part from at least one use position into a non-use position;
a memory device which, at least in a starting position, lies outside the force flux between backrest and seat part, the memory device comprising a marker disk mounted rotatably about a disk axis and, during the pivoting release operation, coupled to the backrest and, in the starting position, coupled to the seat part, the marker disc having a first toothing curved about the disk axis, wherein the backrest is assigned a second toothing, wherein the first toothing and the second toothing are in engagement with each other during the pivoting release operation;
a control lever deflectable relative to the seat part and at least temporarily coupling the marker disk to the seat part;
a release lever; and
a coupler hinged to the control lever and, for the pivoting release operation, coupled to the release lever, wherein the deflected control lever and/or the coupler which is moved by the deflected control lever bring the first toothing and the second toothing into engagement with each other for the pivoting release operation, wherein, in the starting position, the marker disk is coupled to the seat part by means of a lock receptacle and a control element which is movable relative to the lock receptacle, and the lock receptacle is a portion of a control contour by means of which the control element, arranged on the control lever, keeps the control lever deflected during the pivoting release operation, wherein the lock receptacle is provided on the marker disk and the control element is provided fixedly on the control lever, wherein the control contour is partially curved about the disk axis.

12. The vehicle seat as claimed in claim 11, wherein the disk axis of the marker disk is aligned with the backrest axis.

13. The vehicle seat as claimed in claim 11, wherein:
the second toothing is formed on a pawl which is mounted pivotably on the backrest; and
in the starting position, the coupler keeps the pawl at a distance from the marker disk, by means of a holding lug, and releases said pawl for the pivoting release operation.

14. The vehicle seat as claimed in claim 11, wherein the disk axis of the marker disk is arranged offset and parallel to the backrest axis.

15. The vehicle seat as claimed in claim 14, wherein the lock receptacle is provided on a seat part element, fixed on the seat part, and the control element is provided fixedly on the marker disk.

16. The vehicle seat as claimed in claim 15, wherein:
the marker disk is mounted rotatably on the control lever; and
the second toothing is formed on the backrest element and is curved about the backrest axis.

17. The vehicle seat as claimed in claim 11, further comprising an actuating element connected to the release lever for conjoint rotation, via a shaft, for pivoting to release the fitting.

18. The vehicle seat as claimed in claim 11, further comprising an actuating element operatively connected to the coupler via a cable, to be actuated for a pivoting release operation.

19. A fitting system for a vehicle seat, the fitting system comprising:
a fitting which is affected by a force acting between a backrest of the vehicle seat and a seat part of the vehicle seat and by means of which the backrest is pivotable in a pivoting release operation about a backrest axis relative to the seat part from at least one use position into a non-use position;
a memory device which, at least in a starting position, in which the at least one fitting is locked, is not affected by a force acting between the backrest and the seat part, the memory device comprising a marker disk mounted rotatably about a disk axis and, during the pivoting release operation, coupled to the backrest and, in the starting position, coupled to the seat part, the marker disk having a first toothing curved about the disk axis, wherein the backrest is assigned a second toothing, wherein the first toothing and the second toothing are in engagement with each other during the pivoting release operation;
a control lever deflectable relative to the seat part and at least temporarily coupling the marker disk to the seat part;
a release lever; and
a coupler hinged to the control lever and, for the pivoting release operation, coupled to the release lever, wherein the deflected control lever and/or the coupler which is moved by the deflected control lever bring the first toothing and the second toothing into engagement with each other for the pivoting release operation, wherein, in the starting position, the marker disk is coupled to the seat part by means of a lock receptacle and a control element which is movable relative to the lock receptacle, and the lock receptacle is a portion of a control contour by means of which the control element, arranged on the control lever, keeps the control lever deflected during the pivoting release operation, the lock receptacle being provided on the marker disk and the control element being provided fixedly on the control lever, the control contour being partially curved about the disk axis.

* * * * *